(12) United States Patent
Heinrich et al.

(10) Patent No.: US 6,560,814 B2
(45) Date of Patent: May 13, 2003

(54) WINDSHIELD WIPER ARM WITH PIVOT LIMITING MEANS

(75) Inventors: Laurent Heinrich, Illkirch-Graffenstaden (FR); Gerd Kuehbauch, Buehlertal (DE); Karlheinz Lorenz, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/959,398

(22) PCT Filed: Feb. 2, 2001

(86) PCT No.: PCT/DE01/00392
§ 371 (c)(1),
(2), (4) Date: Jan. 18, 2002

(87) PCT Pub. No.: WO01/62560
PCT Pub. Date: Aug. 30, 2001

(65) Prior Publication Data
US 2002/0178527 A1 Dec. 5, 2002

(30) Foreign Application Priority Data

Feb. 24, 2000 (DE) .......................................... 100 08 644

(51) Int. Cl.⁷ .................................................. B60S 1/32
(52) U.S. Cl. ............................. 15/250.352; 15/250.351
(58) Field of Search ................... 15/250.351, 250.352, 15/250.34, 250.202, 250.31, 250.19

(56) References Cited

U.S. PATENT DOCUMENTS

| 2,838,782 | A | * | 6/1958 | Wallis | ................... | 15/250.352 |
| 2,975,457 | A | * | 3/1961 | Scinta | ..................... | 15/250.21 |
| 3,344,458 | A | * | 10/1967 | Deibel | ................... | 15/250.352 |
| 3,422,484 | A | * | 1/1969 | Carpenter | ................ | 15/250.04 |
| 3,548,442 | A | * | 12/1970 | Stratton | .................... | 15/250.34 |

FOREIGN PATENT DOCUMENTS

| DE | 199 51 440 | | 5/2001 | | |
| EP | 575241 | * | 12/1993 | ............ | 15/250.352 |
| EP | 0755833 | * | 1/1997 | ............ | 15/250.352 |
| EP | 770525 | * | 5/1997 | | |
| FR | 1113178 | * | 3/1956 | ............ | 15/250.352 |
| GB | 2004734 | * | 4/1979 | ............. | 15/250.34 |
| GB | 2205033 | * | 11/1988 | ............ | 15/250.352 |
| IT | 532154 | * | 10/1956 | ............ | 15/250.352 |
| JP | 360206755 | * | 10/1985 | ............ | 15/250.352 |
| JP | 405213159 | * | 8/1993 | ............ | 15/250.352 |

* cited by examiner

*Primary Examiner*—Gary K. Graham
(74) *Attorney, Agent, or Firm*—Nixon Peabody LLP; David S. Safran

(57) ABSTRACT

In a windshield wiper arm with a first component arm (10), a second component arm (12) and a hinge which joins the first and the second component arm to one another with a folding capacity so that the two component arms can be swivelled relative to one another out of an initial position into a pivoted-up position, the pivoted-up position will be precisely defined. For this purpose it is provided that the first component arm is provided with at least one catch (18) and the second component arm is provided with at least one projection (20) which are arranged such that they can make contact with one another in order to prevent swivelling of the two component arms beyond the pivoted-up position.

1 Claim, 5 Drawing Sheets

WINDSHIELD WIPER ARM WITH PIVOT LIMITING MEANS

BACKGROUND OF THE INVENTION

1. Field of the Invention

The invention relates to a windshield wiper arm with a first component arm, a second arm component and a hinge which joins the first and the second arm component to one another with a folding capacity so that the two component arms can be pivoted relative to one another out of an initial position into a pivoted-up position.

2. Description of Related Art

One of the component arms of the windshield wiper arm is provided with a windshield wiper rubber and the other windshield wiper arm is caused to execute pivoting motion by a windshield wiper drive. In the initial position the windshield wiper rubber rests on the windshield to be cleaned. The two component arms are pivoted relative to one another into the pivoted-up position in order to replace the windshield wiper rubber, for example. In the known windshield wiper arms in which one of the two component arms is provided with two hinge clips which are parallel to one another and which surround the other arm component the pivoted-up position in the overextended state is defined by the crosspiece between the two hinge clips of one arm component adjoining the other component arm. On the one hand, the disadvantage here is that based on the resulting linear contact between the two component arms, locally very high stresses can arise which can lead to damage of an enamel layer which is present, for example. On the other hand, the disadvantage is that one arm component adjoins the other in the area which is visible from the outside when the two component arms assume their initial position relative to one another so that possible damage becomes apparent.

SUMMARY

The object of the invention is to develop a windshield wiper arm of the initially mentioned type such that the pivoted-up position of the two component arms relative to one another is defined precisely and no damage to the two component arms at all can occur when they adjoin one another in the pivoted-up position.

ADVANTAGES OF THE INVENTION

The windshield wiper arm in accordance with the invention has the advantage that, at this point, there are separate stop surfaces which can be designed with regard to the respective requirements. On the one hand, a comparatively large contact surface between the catch and the projection can be chosen so that the contact forces are small. On the other hand, the catch and the projection can be arranged such that they are not apparent during operation.

The invention is described below with reference to two embodiments which are shown in the attached drawings.

DETAILED DESCRIPTION OF THE INVENTION

Figure 1:
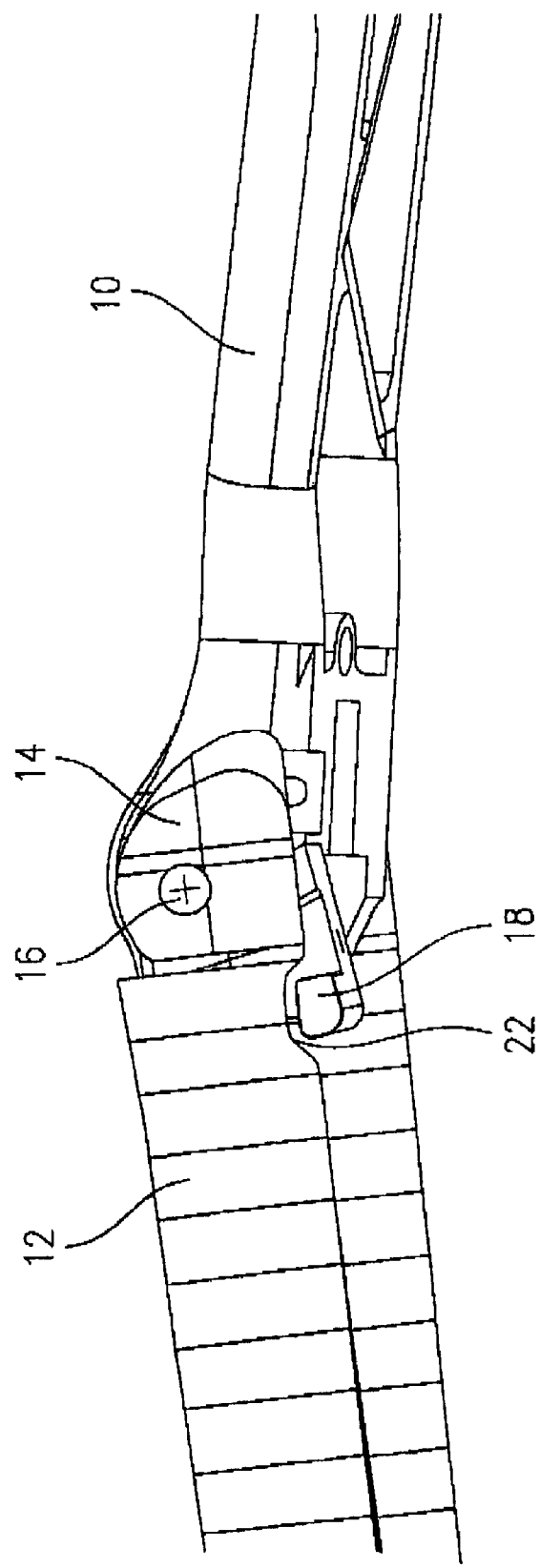
FIG. 1 is a perspective view a portion of a windshield wiper arm according to the first embodiment in the initial position.
Figure 2:
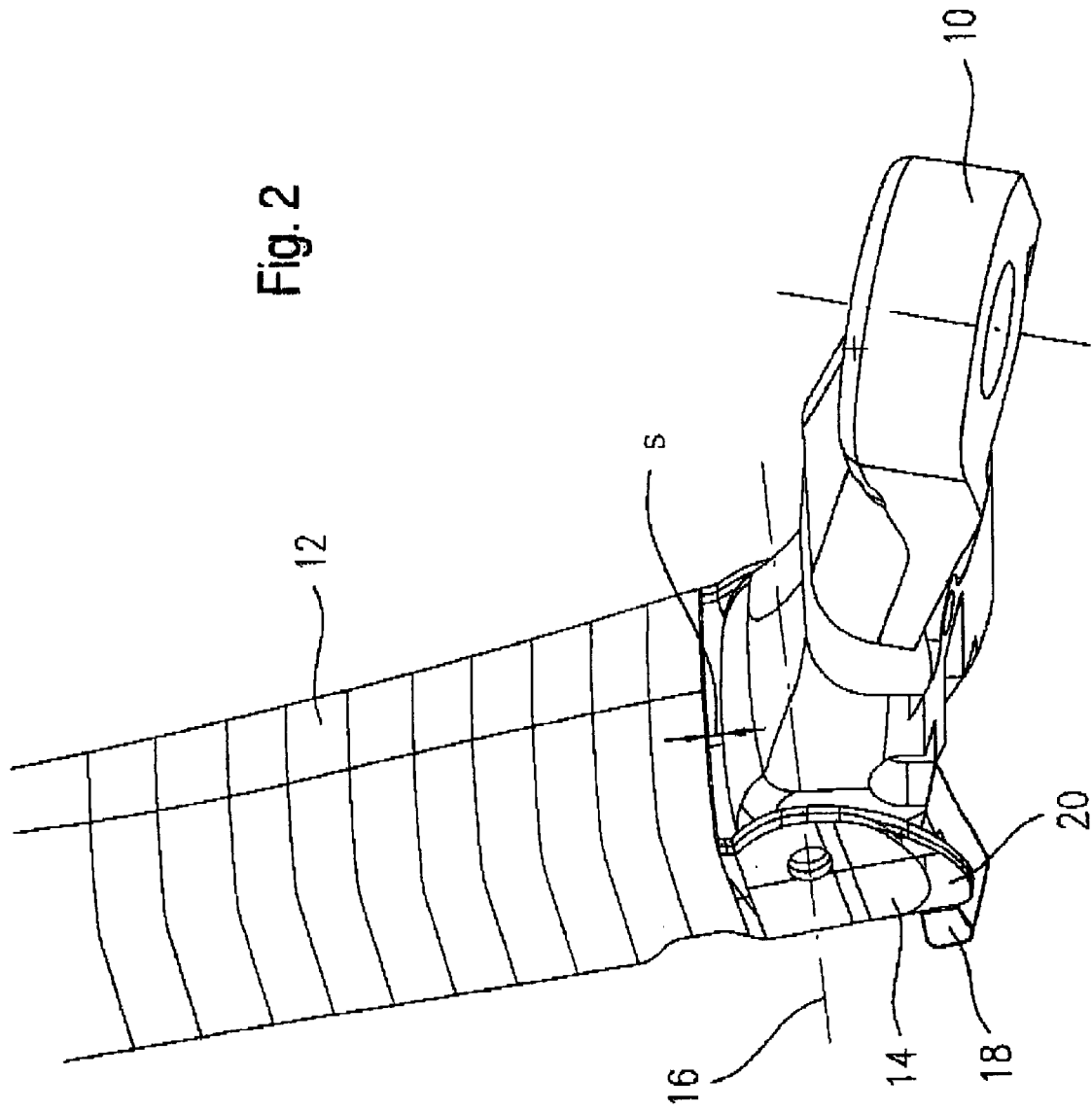
FIG. 2 is a perspective view the portion of the windshield wiper arm shown in FIG. 1 in the pivoted-up position.
Figure 3:
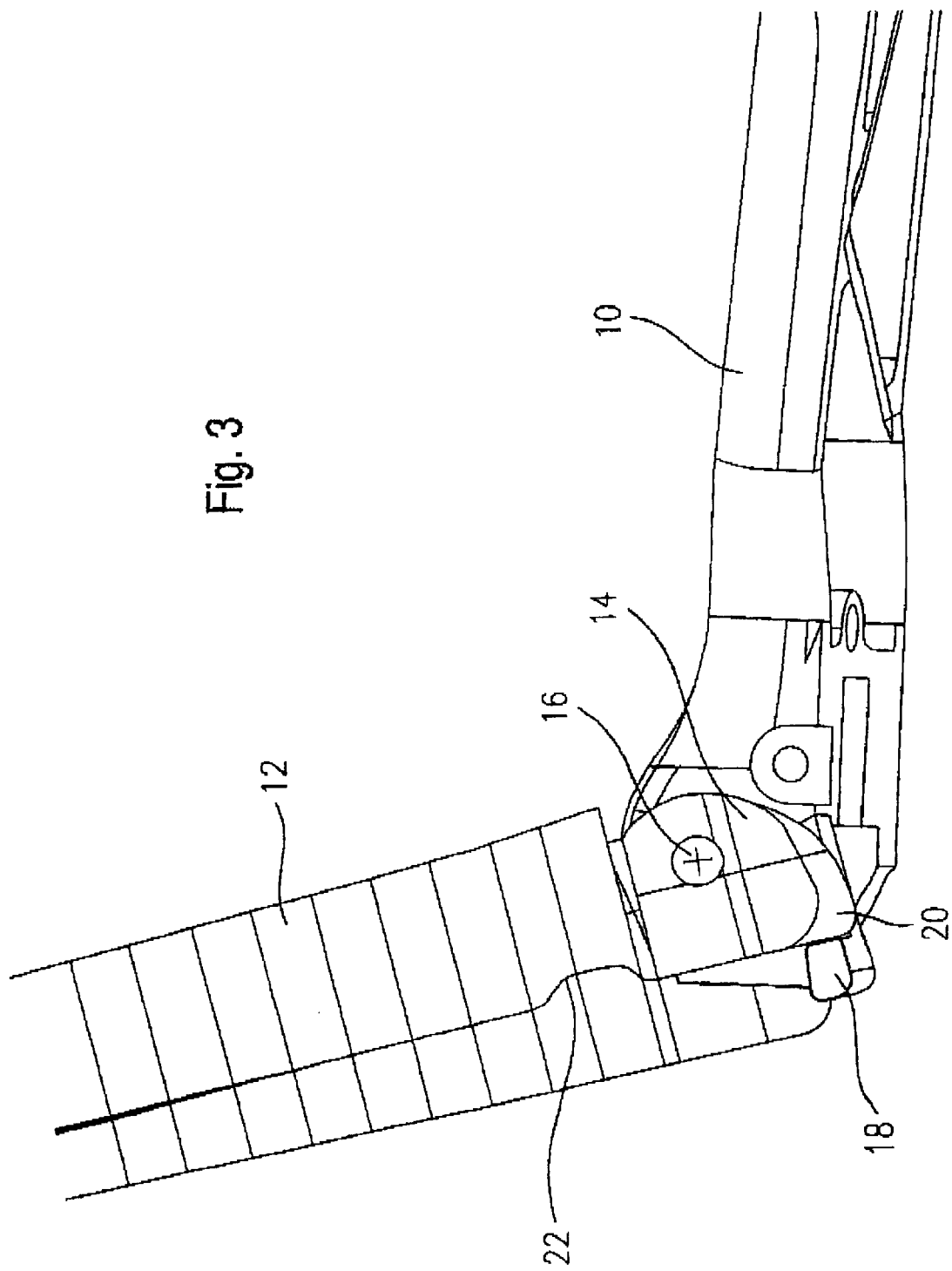
FIG. 3 shows the windshield wiper arm from FIG. 2 in another perspective representation.

FIGS. 1 to 3 show a windshield wiper arm according to the first embodiment of the invention. The wiper arm has a first arm component 10 which can be connected to a windshield wiper drive (not shown), and a second arm component 12 which can be provided with a windshield wiper rubber (likewise not shown). The first arm component 10 is made here as a cast part, while the second arm component 12 is made as a bent sheet metal part with a generally U-shaped cross section. The second arm component 12, on its end assigned to the first arm component 10, has two hinge clips 14 which extend parallel to one another and through which a hinge pin extends which is symbolized by its center axis 16. The hinge pin is accommodated in a corresponding hole in the first arm component 10 so that a hinge is formed which makes it possible to pivot the first and the second arm components relative to one another out of the initial position which is shown in FIG. 1 into the pivoted-up position which is shown in FIGS. 2 and 3.

The first arm component 10 is provided with a catch 18 which extends into the plane of the hinge clip 14. The corresponding hinge clip 14 is provided with a projection 20 which is made as an extension of the hinge clip. The catch 18 and the projection 20 are made such that they form a stop (see especially FIG. 3) which defines the pivoted-up position of the two arm components 10, 12. Preferably, the catch 18 and the projection 20 are made such that, in the pivoted-up position, there is surface contact between the sections of the catch and the projection which are used as stop surfaces. FIG. 2 also clearly shows the distance s which is present in the pivoted-up state between the first and the second arm component so that damage to the first arm component is prevented by linear contact with the second component arm.

As can be seen in FIG. 1, the second arm component 12 has a recess 22 which makes it possible to arrange the catch 18 comparatively near the axis 16 of the hinge without hindering the arm component from being pivoted back down into the initial position.

Figure 4:
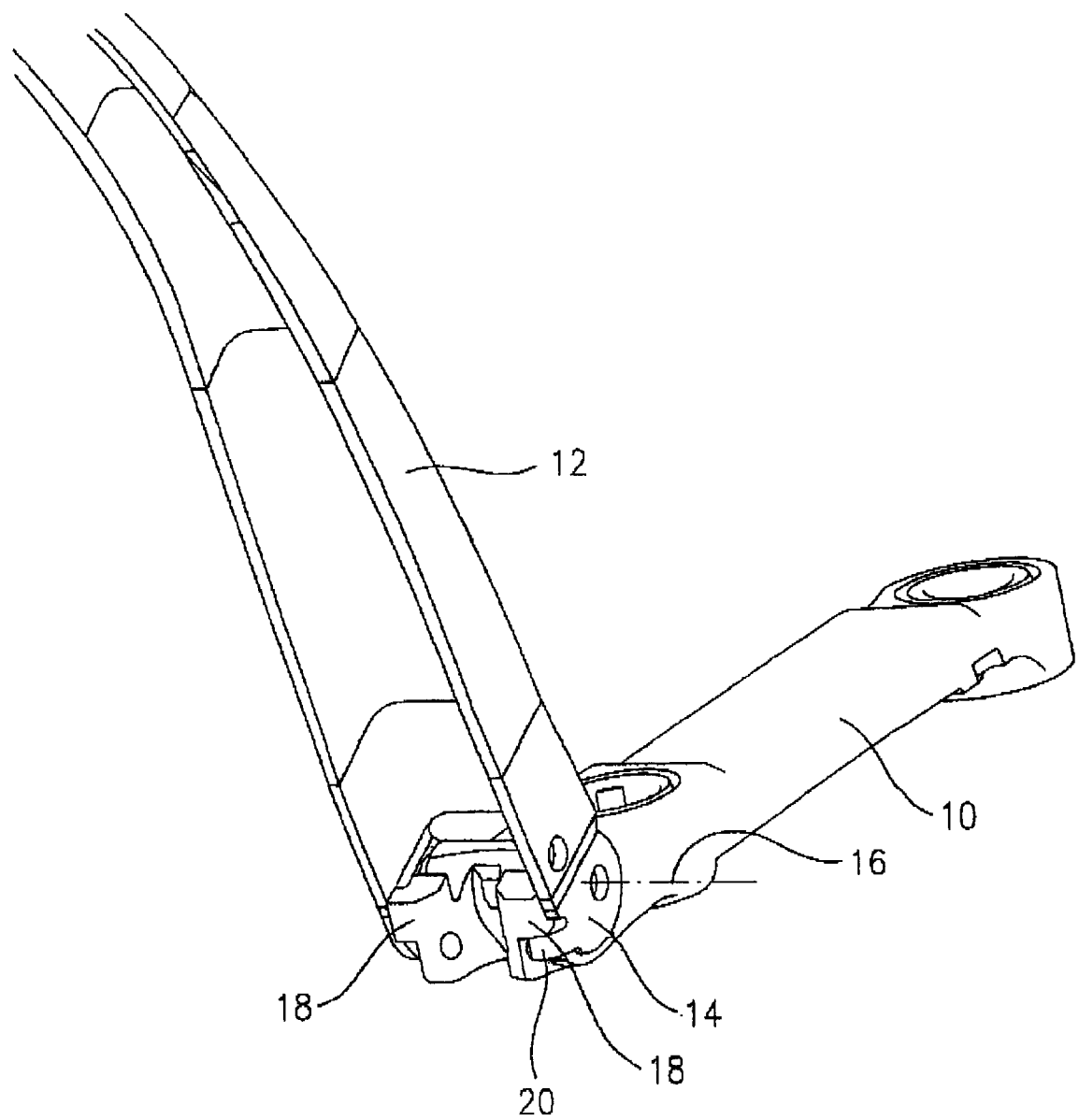
FIG. 4 is a perspective view a portion of a windshield wiper arm according to the second embodiment in the pivoted-up position.
Figure 5:
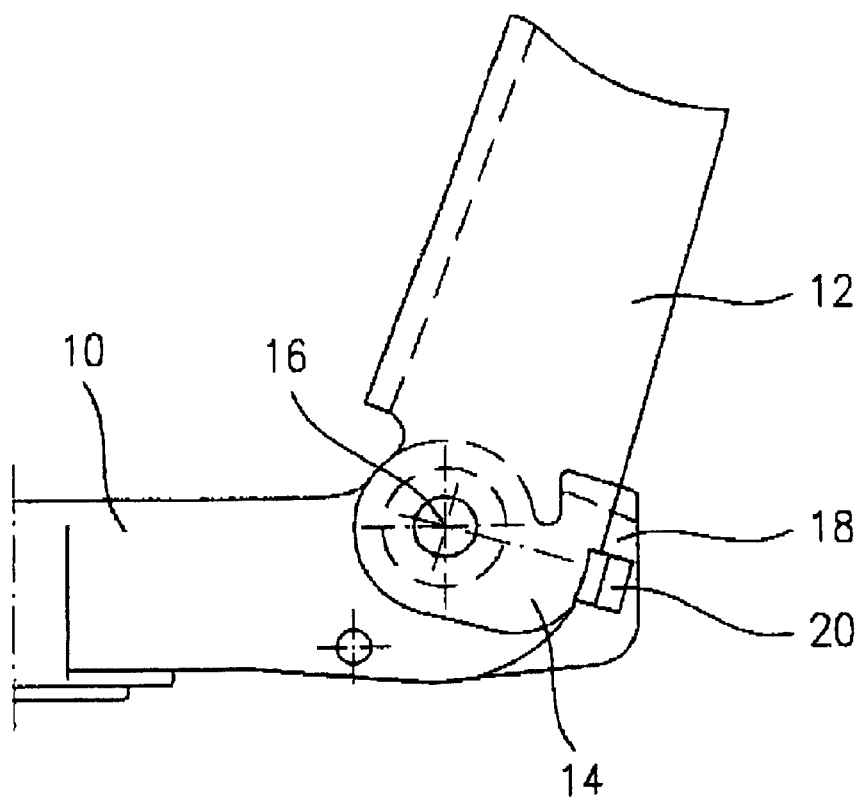
FIG. 5 is a side view of the portion of the windshield wiper arm shown in FIG. 4.
Figure 6:
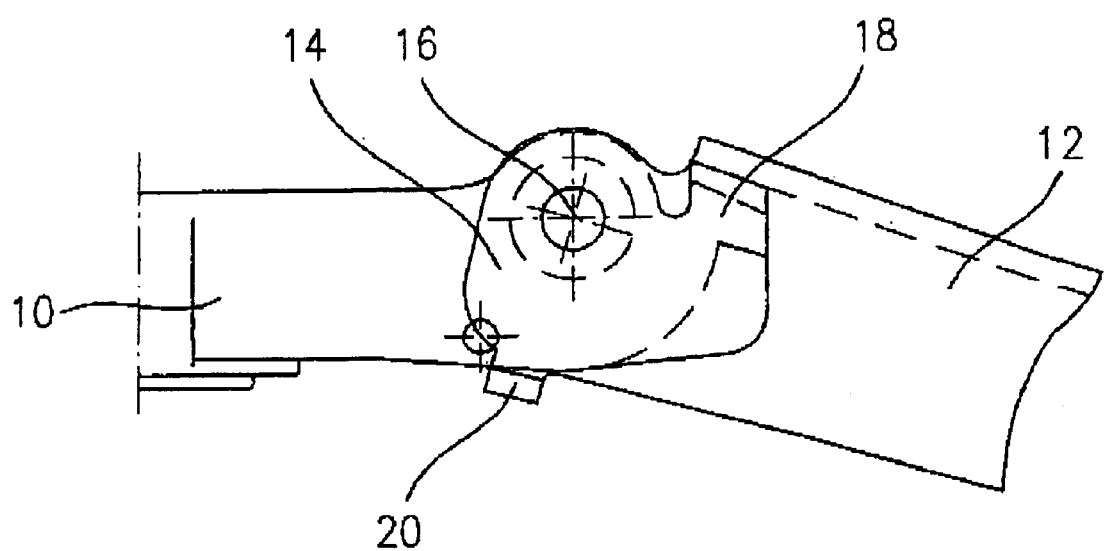
FIG. 6 is a side view of the portion of the windshield wiper arm shown in FIG. 5 in the initial position.

FIGS. 4 to 6 show a windshield wiper arm according to the second embodiment of the invention. For the components known from the first embodiment, the same reference numbers are used and reference is made to the explanations above.

In contrast to the first embodiment, in the second embodiment, the projection 20 on the hinge clip 14 does not extend in the same plane as the hinge clip, but is bent in a hook shape toward the opposite hinge clip. For this reason, the catch 18 on the first arm component need no longer extend into the plane of the hinge clip, but is located entirely with the area bordered by the hinge clip.

In this embodiment as well, the catch and the projection are made such that, when the first and the second arm component are in the pivoted-up position relative to one another surface contact is established between the catch and the projection so that the pivoted-up position is precisely defined.

Depending on the application, the projection and the catch can be on one side of the hinge or the other or also on either side of the hinge. It is furthermore possible to interchange the arrangement of the projection and the catch, therefore making the catch on the first arm component and the projection on the second component arm.

What is claimed is:

1. Windshield wiper arm comprising:

a first arm component, a second arm component, and a hinge which pivotally joins the first and the second arm components to one another so that the two component arms can be pivoted relative to one another out of an initial position into a pivoted-up position, wherein the first arm component is provided with at least one catch and the second arm component is provided with at least one projection, the at least one catch being arranged relative to the at least one projection in a manner resulting in a contact between the at least one catch and the at least one projection which prevents pivoting of the arm components beyond the pivoted-up position;

wherein the second arm component has two hinge clips which surround the first arm component, wherein the at least one projection is made on one of said hinge clips; and wherein the at least one projection has a hook shape that projects from a plane of the one hinge clip toward the other hinge clip.

* * * * *